(12) United States Patent
Grattan

(10) Patent No.: US 9,908,564 B1
(45) Date of Patent: Mar. 6, 2018

(54) VEHICLE BODY STRUCTURE

(71) Applicant: Nissan North America, Inc., Franklin, TN (US)

(72) Inventor: Patrick Grattan, Wixom, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/485,991

(22) Filed: Apr. 12, 2017

(51) Int. Cl.
*B62D 27/02* (2006.01)
*B62D 21/15* (2006.01)
*B62D 21/02* (2006.01)
*B62D 29/00* (2006.01)

(52) U.S. Cl.
CPC ......... *B62D 27/023* (2013.01); *B62D 21/155* (2013.01); *B60Y 2410/124* (2013.01); *B62D 21/02* (2013.01); *B62D 29/007* (2013.01)

(58) Field of Classification Search
CPC .............................. B62D 27/023; B62D 21/155
USPC ............................ 296/29, 187.09, 187.1, 205
See application file for complete search history.

(56) References Cited

U.S. PATENT DOCUMENTS

| 6,604,884 B1 | 8/2003 | Ohkura | |
| 6,813,818 B2 * | 11/2004 | Schmidt | B21D 26/14 219/611 |
| 7,137,658 B2 | 11/2006 | Haneda et al. | |
| 8,590,950 B2 * | 11/2013 | Hermanson | B60D 1/565 293/102 |

FOREIGN PATENT DOCUMENTS

| EP | 2487055 A1 | 8/2012 |
| WO | 03-051654 A1 | 6/2003 |

OTHER PUBLICATIONS

Images of Nissan Titan Frame Structure Jan. 2017.

* cited by examiner

*Primary Examiner* — Joseph D. Pape
(74) *Attorney, Agent, or Firm* — Global IP Counselors, LLP

(57) ABSTRACT

A collar assembly has a sleeve, a first collar, a second collar and a third collar. The sleeve is configured to loosely extend into a first opening in a beam, a hollow interior of the beam and a second opening of the beam. The first collar attaches to one end of the sleeve and includes a first attachment flange that overlays a portion of an exterior surface of the beam and a first alignment flange that extends into a first opening of the beam. The second collar has a second attachment flange that overlays a portion of another exterior surface of the beam with the sleeve extending through an aperture with the sleeve member. The first and second collars are re-position-able along exterior surfaces of the beam such that the sleeve member is moved to a predetermined orientation relative to the beam prior to attachment to the beam.

19 Claims, 9 Drawing Sheets

VEHICLE BODY STRUCTURE

BACKGROUND

Field of the Invention

The present invention generally relates to a vehicle body structure. More specifically, the present invention relates to a vehicle body structure with a collar assembly used to align and attach structural elements to one another.

Background Information

Vehicle body structures typically include frame and/or beam elements that attach to one another. Beam elements of the frame are often made of thick steel/metal materials that are forged and/or worked to form specific shapes and openings in the frame elements. When the frame elements are manufactured using forging and/or metal working (deformation) techniques, tolerances must be large in order to take manufacturing processes into account, such as changes in length and thicknesses that occur as metal is worked.

SUMMARY

One object of the present disclosure is to provide a plurality of collars that subsequently connect a first frame element to a second frame element, where the first frame element is inserted into an opening or openings that are oversized. The plurality of collars allow for positioning of the first frame element within the oversized opening in order to put the first frame element into a predetermined position or orientation relative to the second frame element.

In view of the state of the known technology, one aspect of the present disclosure is to provide a vehicle body structure with a beam, a sleeve member, a first collar and a second collar. The beam has a first wall and a second wall opposite the first wall defining a hollow interior therebetween. The first wall has a first opening and the second wall having a second opening. The sleeve member extends through the first opening, the hollow interior and the second opening of the beam. The sleeve member has a first end located proximate the first wall and a second end spaced apart from the second wall and the hollow interior of the beam. The first collar has a first attachment flange that overlays a portion of an exterior surface of the first wall of the beam and a first alignment flange defining a first aperture with the first end of the sleeve member extending into the first aperture of the first collar. The first alignment flange extends from the first attachment flange and into the first opening of the first wall of the beam. The second collar has a second attachment flange that overlays a portion of an exterior surface of the second wall of the beam. The second collar has a second aperture with the sleeve member extending therethrough. With the sleeve member in an uninstalled state relative to the beam, the first collar and the second collar are re-positionable along the exterior surfaces of the beam such that the sleeve member is moved to a predetermined orientation relative to the beam and in an installed state the first collar and the second collar are fixedly attached to the beam and the sleeve member with the sleeve member being fixedly positioned in the predetermined orientation by the first and second collars.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-4, a vehicle 10 is illustrated in accordance with a first embodiment. The vehicle 10 is provided with a collar assembly 12 that is used to attach a first beam member to a second beam member, such as installation of an off-center impact structure 14 to a beam of the vehicle 10. A detailed description of the collar assembly 12 is provided below, after a description of portion of the vehicle 10 and the off-center impact structure 14.

The off-center impact structure 14 is configured to absorb and re-direct forces during an impact event such as an off-center impact test (also referred to as a small overlap test). The off-center impact structure 14 and the small overlap test are described in greater detail in co-pending and co-assigned U.S. application Ser. No. 15/404,334, filed Jan. 12, 2017. U.S. application Ser. No. 15/404,334 is incorporated herein by reference in its entirety.

Figure 1:
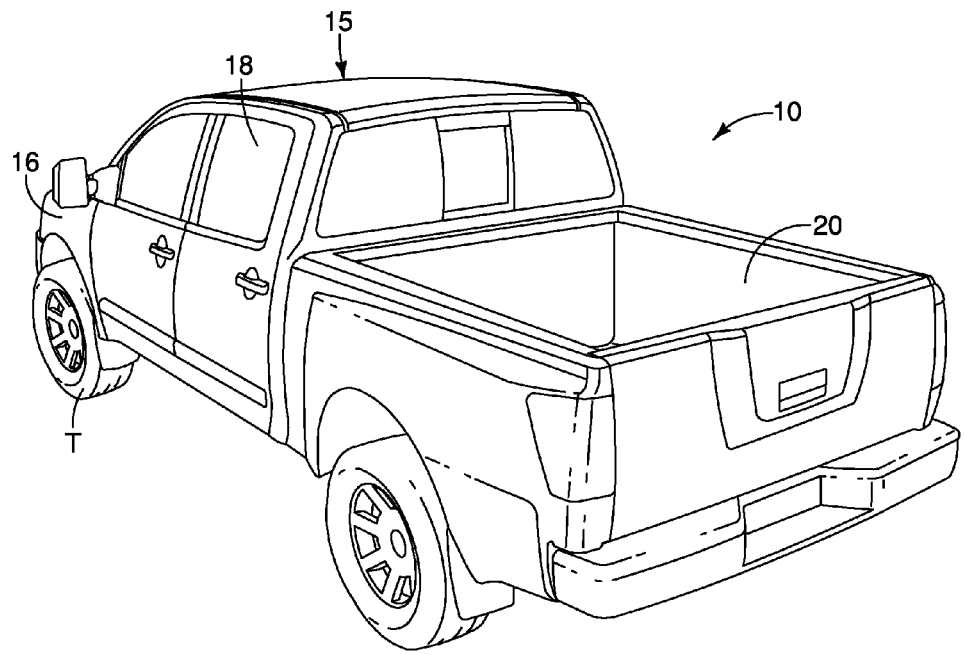
FIG. 1 is a perspective view of the vehicle having an off-center impact structure installed with a collar assembly in accordance with the first embodiment.

FIG. 1 shows one embodiment of the vehicle 10 that employs the collar assembly 12 and the off-center impact structure 14. In FIG. 1, the vehicle 10 is depicted as a pickup truck that includes a vehicle body structure 15 that defines, for example. an engine compartment 16, a passenger compartment 18 and a cargo area 20. The vehicle body structure 15 is installed to and rests on a frame 22. The frame 22 is shown removed from the vehicle 10 in FIGS. 2, 3 and 4. Specifically, FIG. 2 shows the frame 22 with the off-center impact structure 14 installed thereto via the collar assembly 12, and FIG. 3 shows only a front area of the frame 22 with the off-center impact structure 14 installed thereto.

In FIG. 1, the depicted pickup truck that defines the vehicle 10 is a heavy-duty vehicle intended to haul large and/or heavy materials. The frame 22 is therefore a rigid, strong structure able to withstand heavy duty usage. However, it should be understood from the drawings and the description herein, that the frame 22 and the off-center impact structure 14 described below can be configured for smaller vehicles or larger vehicles and is not limited to usage in a heavy-duty vehicle such as the vehicle 10. In other words, the off-center impact structure 14 can be used on any size vehicle that includes a frame such as the frame 22 where the vehicle body structure 15 attaches to and is supported by the frame 22. It should also be understood from the drawings and description, that the collar assembly 12 and the off-center impact structure 14 can also be employed with a unibody vehicle. A unibody vehicle is a vehicle that does not typically includes a separate frame such as the frame 22. Rather, the unibody vehicle includes various structural elements welded together. Elements of the unibody vehicle serve as frame elements functionally equivalent to the elements of the frame 22. For example, U.S. Pat. No. 8,870,267 assigned to Nissan North America, discloses a unibody vehicle body structure. The front structural support portions (30) disclosed in U.S. Pat. No. 8,870,267 are basically vehicle side members, such as those of the frame 22 (described in greater detail below). U.S. Pat. No. 9,180,913, also assigned to Nissan North America, also discloses a unibody vehicle body structure and further discloses an engine cradle. The elements of the off-center impact structure 14 can be installed to portions of the unibody vehicle disclosed in U.S. Pat. No. 8,870,267 and portions of the engine cradle of U.S. Pat. No. 8,870,267. Both U.S. Pat. No. 8,870,267 and U.S. Pat. No. 9,180,913 are incorporated herein by reference in their entirety. Since unibody vehicles are conventional structures, further description is omitted for the sake of brevity.

Figure 2:
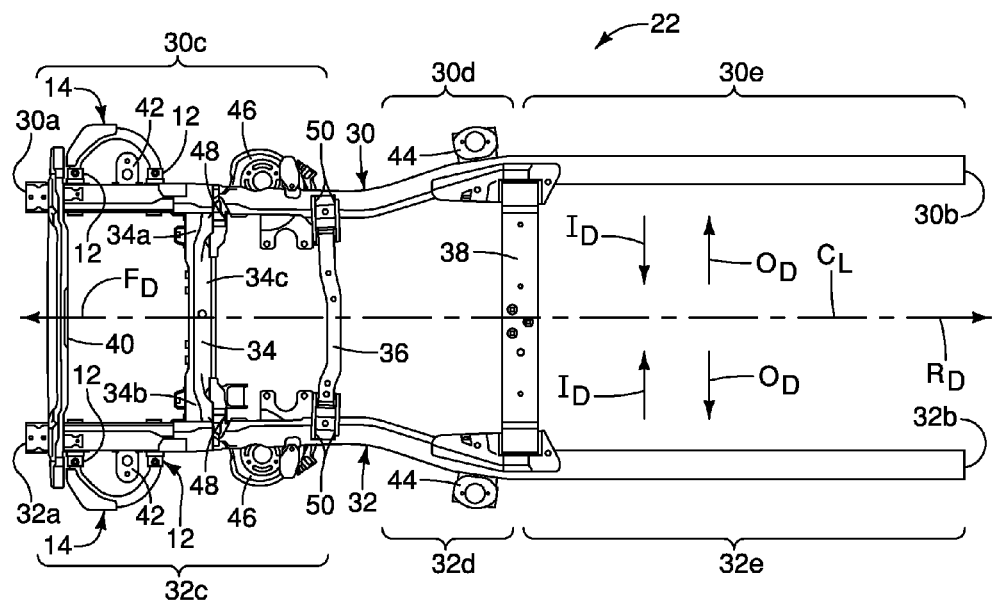
FIG. 2 is a bottom view (looking upward) of a frame from the vehicle depicted in FIG. 1, showing two of the off-center impact structures attached to respective a first side members at either side of the frame each employing one of the collar assemblies in accordance with the first embodiment.
Figure 3:
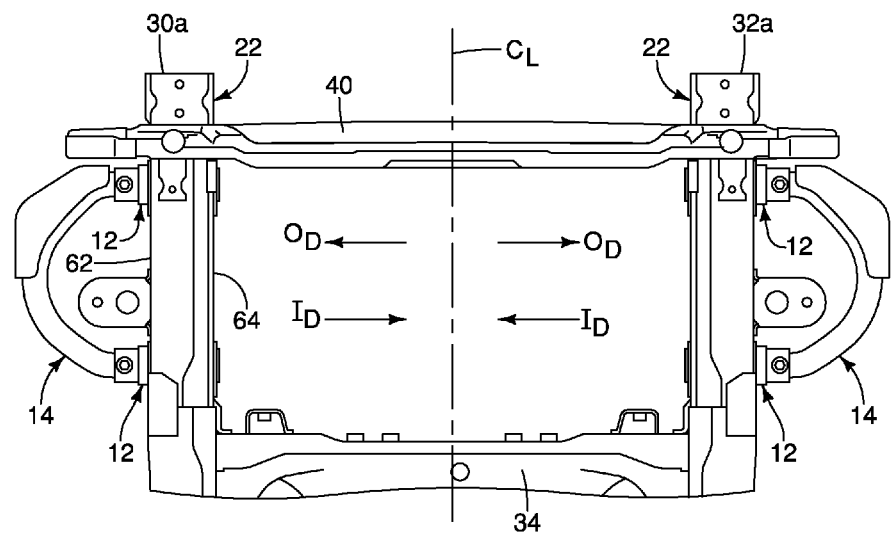
FIG. 3 is a top view (looking downward) of a portion of the frame depicted in FIG. 2, with the off-center impact structure installed to first side member of the frame structure using the collar assemblies in accordance with the first embodiment.

The off-center impact structure 14 is shown in FIGS. 2 and 3 installed to specific portions of the frame 22.

In FIG. 2 several directions relative to the frame 22 (and the vehicle 10) are shown in order to define orientations of the various features of the vehicle 10 and the off-center impact structure 14. Specifically, the vehicle 10 and the frame 22 define a longitudinal center line $C_L$ that extends in a lengthwise direction of the vehicle 10 along a central portion of the vehicle 10. At a left-hand side of FIG. 2, a forward direction $F_D$ is indicated by the depicted arrow, and at a right-hand side of FIG. 2 a rearward direction $R_D$ is indicated by the depicted arrow. As well, inboard directions $I_D$ and outboard directions $O_D$ relative to the longitudinal center line $C_L$ are also shown in FIG. 2.

As shown in FIG. 2, the frame 22 includes a first side member 30, a second side member 32, a first cross-member 34, a second cross-member 36 and a third cross-member 38 and a front cross-member 40. FIG. 2 shows an underside of the frame 22. In other words, the depiction of the frame 22 is taken from below the frame 22 looking upward. The frame 22 is made of heavy gauge steel, but can alternatively be made of other materials depending upon the overall design of the vehicle 10. It should therefore be understood that the first side member 30 extends along and under a driver's side of the vehicle 10, and the second side member 32 extends along and under a passenger's side of the vehicle 10.

The first side member 30 is an elongated beam (a beam) that has multiple contours and shapes. Specifically, the first side member 30 has a front end 30*a* and a rear end 30*b*. The first side member 30 also has a first portion 30*c*, a second portion 30*d* and a third portion 30*e*. The first portion 30*c* extends in the rearward direction $R_D$ from the front end 30*a* to a location proximate the second cross-member 36. The first portion 30*c* is generally straight. The second portion 30*d* has a curved shape such that just rearward of the first portion 30*c*, the second portion 30*d* gradually curves in the outboard direction $O_D$. The third portion 30*e* is generally straight, but can include contours and curves, depending upon the overall design of the vehicle 10.

Similarly, the second side member 32 is an elongated beam (a second side member) that has multiple contours and shapes that are symmetrical to the first side member 30. Specifically, the second side member 32 has a front end 32*a* and a rear end 32*b*. The second side member 32 also has a first portion 32*c*, a second portion 32*d* and a third portion 32*e*. The first portion 32*c* extends in the rearward direction $R_D$ from the front end 32*a* to a location proximate the second cross-member 36. The first portion 32*c* is generally straight. The second portion 32*d* has a curved shape such that just rearward of the first portion 32c, the second portion 32d gradually curves in the outboard direction $O_D$.

The first portions 30c and 32c of the first and second side members 30 and 32 are a first distance away from one another, and the third portions 30e and 32e are a second distance away from one another, with the second distance being greater than the first distance.

The first and second side members 30 and 32 each include body attachment structures 42 and 44 (also referred to as attachment flanges). The body attachment structures 42 and 44 are welded to the first and second side members 30 and 32 and are dimensioned and shaped to attach to the vehicle body structure 15 of the vehicle 10. The body attachment structures 42 extend from outboard sides of the first portions 30c and 32c of the first and second side members 30 and 32 forward of the first cross-member 34. The body attachment structures 44 extend from outboard sides of the second portions 30d and 32d of the first and second side members 30 and 32 rearward of the second cross-member 36.

Although not shown in FIG. 2, the third portions 30e and 32e of the first and second side members 30 and 32 can also include additional body attachment structures configured for attachment to structures that define the cargo area 20 of the vehicle 10. Further, the third portions 30e and 32e can be at the same level above the ground as the first portions 30c and 32c, or can be raised above the ground at a level higher that the first portions 30c and 32c, with the second portions 30d and 32d including an upward curvature.

As shown in FIG. 2, each of the first portions 30c and 32c of the first and second side members 30 and 32 further include front suspension structures such as coil spring supports 46, first suspension structures 48 and second suspension structures 50.

The coil spring supports 46 are rigidly fixed (i.e. welded) to respective ones of the first and second side members 30 and 32. The coil spring supports 46 are dimensioned and shaped to support lower ends of front suspension coil springs in a conventional manner. Since front suspension coil springs are conventional structures, further description is omitted for the sake of brevity.

The first suspension structures 48 are defined by pairs of flanges welded to lower surfaces of the first and second side members 30 and 32. Similarly, the second suspension structures 50 are defined by pairs of flanges welded to lower surfaces of the first and second side members 30 and 32 rearward and spaced apart from the first suspension structures 48. The first suspension structures 48 are adjacent to or aligned with the first cross-member 34. The second suspension structures 50 are adjacent to or aligned with the second cross-member 36.

The first suspension structures 48 and the second suspension structures 50 are configured to support a lower control arm (not shown) for pivotal movement about pivot bolts 54. The lower control arm is part of the steering and suspension structure of the vehicle 10. Since steering and suspension structures (and, in particular, control arm structures) are conventional vehicle components, further description is omitted for the sake of brevity.

The engine compartment 16 of the vehicle body structure 15 is approximately located in the space above and between the first portions 30c and 32c of the first and second side members 30 and 32. A front portion of the passenger compartment 18 is located in the space above and between the second portions 30d and 32d of the first and second side member rearward of the engine compartment 16. The remainder of the passenger compartment 18 and the cargo area 20 of the vehicle body structure 15 are located above the third portions 30e and 32e of the first and second side members 30 and 32.

As shown in FIGS. 2 and 3, the first cross-member 34 is rigidly attached to the first side member 30 and rigidly attached to the second side member 32. The first cross-member 34 can be co-planar with the first and second side members 30 and 32, or can be located above or below the first and second side members 30 and 32. The first cross-member 34 has a first end 34a, a second end 34b and mid-section 34c that extends from the first end 34a to the second end 34b. The first end 34a of the first cross-member is fixed to the first side member 30.

In the depicted embodiment, the first cross-member 34 extends in a vehicle lateral direction from the first portion 30c of the first side member 30 to the first portion 32c of the second side member 30 at a location rearward of the front ends 30a and 32a. The first cross-member 34 is further rigidly fixed to each of the first side member 30 and the second side member 32. As shown in FIGS. 2 and 3, the first cross-member 34 extends perpendicular to the first portion 30c of the first side member 30 and the first portion 32c of the second side member 32.

The second end 34b of the first cross-member 34 is also fixed to the second side member 32 in a manner consistent with the attachment of the first end 34a to the first side member 30. Since the attachment of the second end 34b to the second side member 32 is basically the same as the attachment of the first end 34a to the first side member 30, further description of the attachment of the first cross-member 34 to the second side member 32 is omitted for the sake of brevity.

The second cross-member 36 extends in the vehicle lateral direction and is rigidly fixed to areas of each of the first side member 30 and the second side member 32 rearward of the first cross-member 34. The second cross-member 36 can be welded to each of the first portions 30c and 32c of the first and second side members 30 and 32. However, the second cross-member 36 can be attached to the first and second side members 30 and 32 via mechanical fasteners (not shown).

An engine receiving space is defined in the area confined between the first and second side members 30 and 32, and between the first and second cross-members 34 and 36.

The third cross-member 38 extends between forward ends of each of the third portions 30e and 32e of the first and second side members 30 and 32. The third cross-member 38 is welded to each of the first and second side members 30 and 32 and can serve as an attachment structure for a rear portion of the vehicle body structure 15 (at a mid-portion of the passenger compartment 18), and/or can serve as an attachment structure for the structure that defines the cargo area 20.

The front cross-member 40 is welded or otherwise rigidly fixed to the front ends 30a and 32a of the first and second side members 30 and 32. A bumper structure (not shown) can be attached to the front cross-member 40. Alternatively, the bumper structure (not shown) can be attached to the front ends 30a and 32a of the first and second side members 30 and 32 replacing the front cross-member 40.

Figure 4:
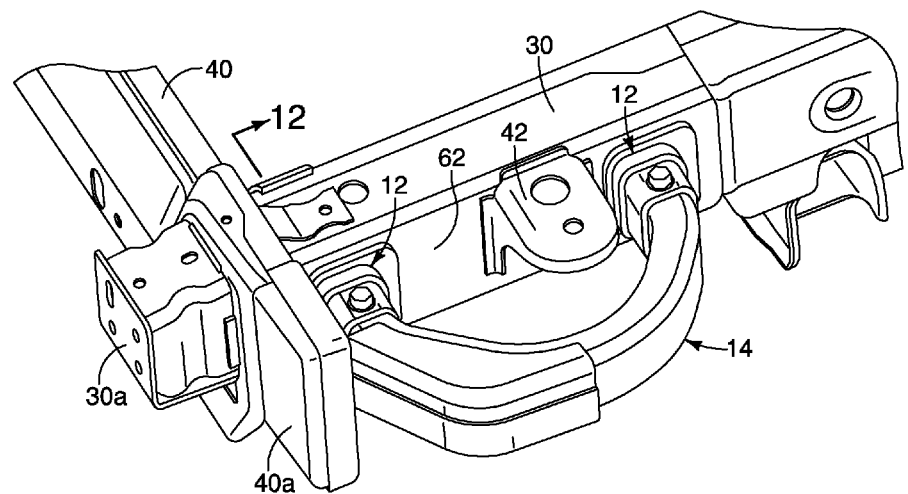
FIG. 4 is a perspective view of a driver's front side of the frame and the off-center impact structure, showing details of the off-center impact structure and the collar assemblies installed to the first side member in accordance with the first embodiment.
Figure 5:
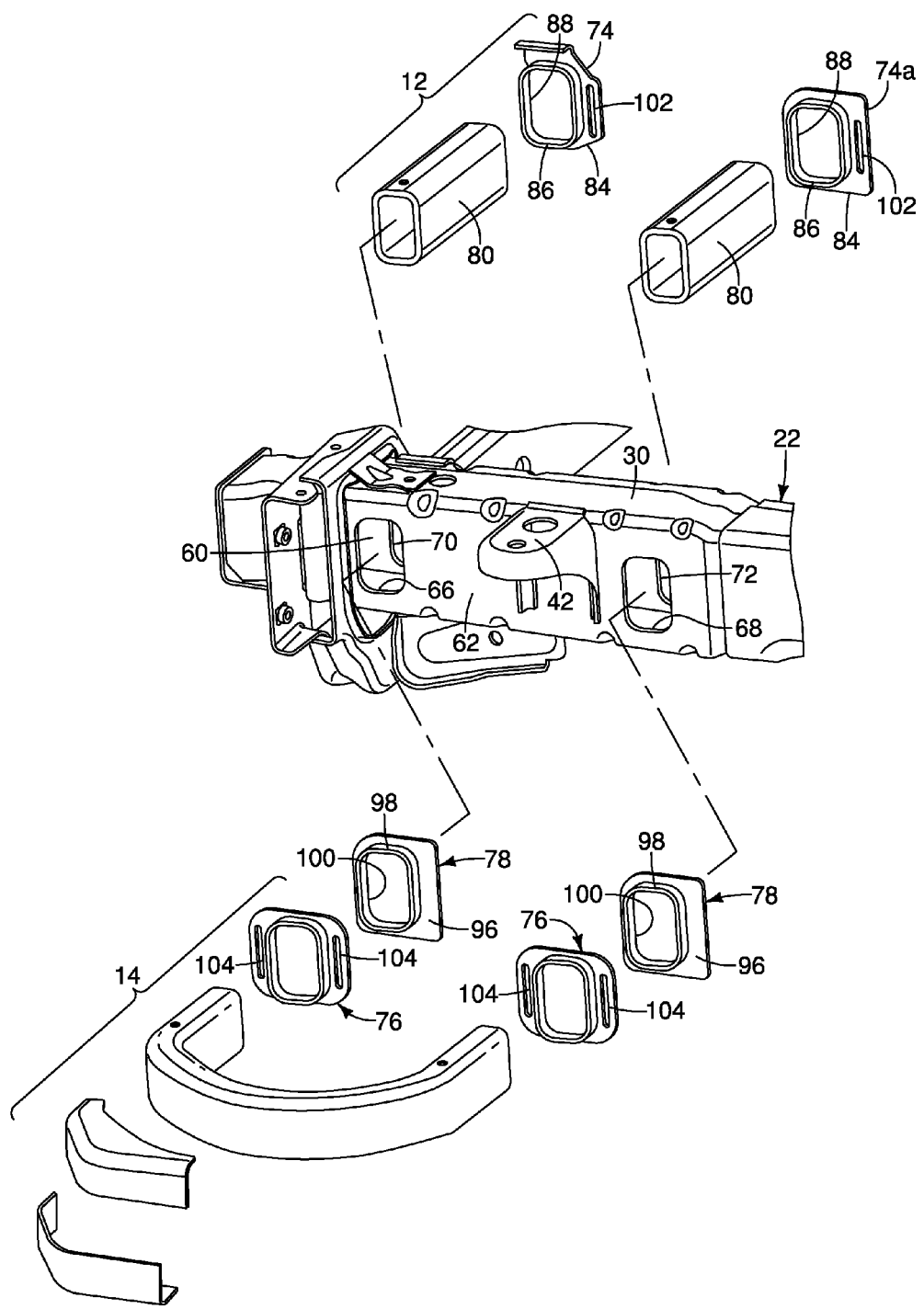
FIG. 5 is an exploded perspective view of the driver's front side of the frame showing the first side member, the off-center impact structure, and elements of two of the collar assemblies, each collar assembly including a first collar, a second collar, a third collar and a sleeve in accordance with the first embodiment.

A description of the off-center impact structure 14 is now provided with specific reference to FIGS. 3, 4 and 5. As shown in FIG. 5, the first side member 30 defines a hollow interior 60 (shown in FIGS. 9, 14 and 15). As is shown in FIGS. 2 and 3, the off-center impact structures 14 is installed to the first side member 30 and another one of the off-center impact structures 14 is installed to the first side member 32.

The two off-center impact structures 14 are symmetrically arranged relative to the longitudinal center line $C_1$ of the vehicle 10. The two off-center impact structures 14 are basically identical, except that they are mirror images of one another. Consequently, description of one of the off-center impact structures 14 applies equally to the other. Therefore, only one of the off-center impact structures 14 is described herein below for the sake of brevity.

The first portion 30c (also referred to as the front-section) of the first side member 30 extends in a rearward direction from the front end 30a of the first side member in a vehicle longitudinal direction parallel to the longitudinal center line $C_1$. As shown in FIGS. 3-5 and 9-17, the first side member 30 has an outboard wall 62 and an inboard wall 64.

Figure 15:
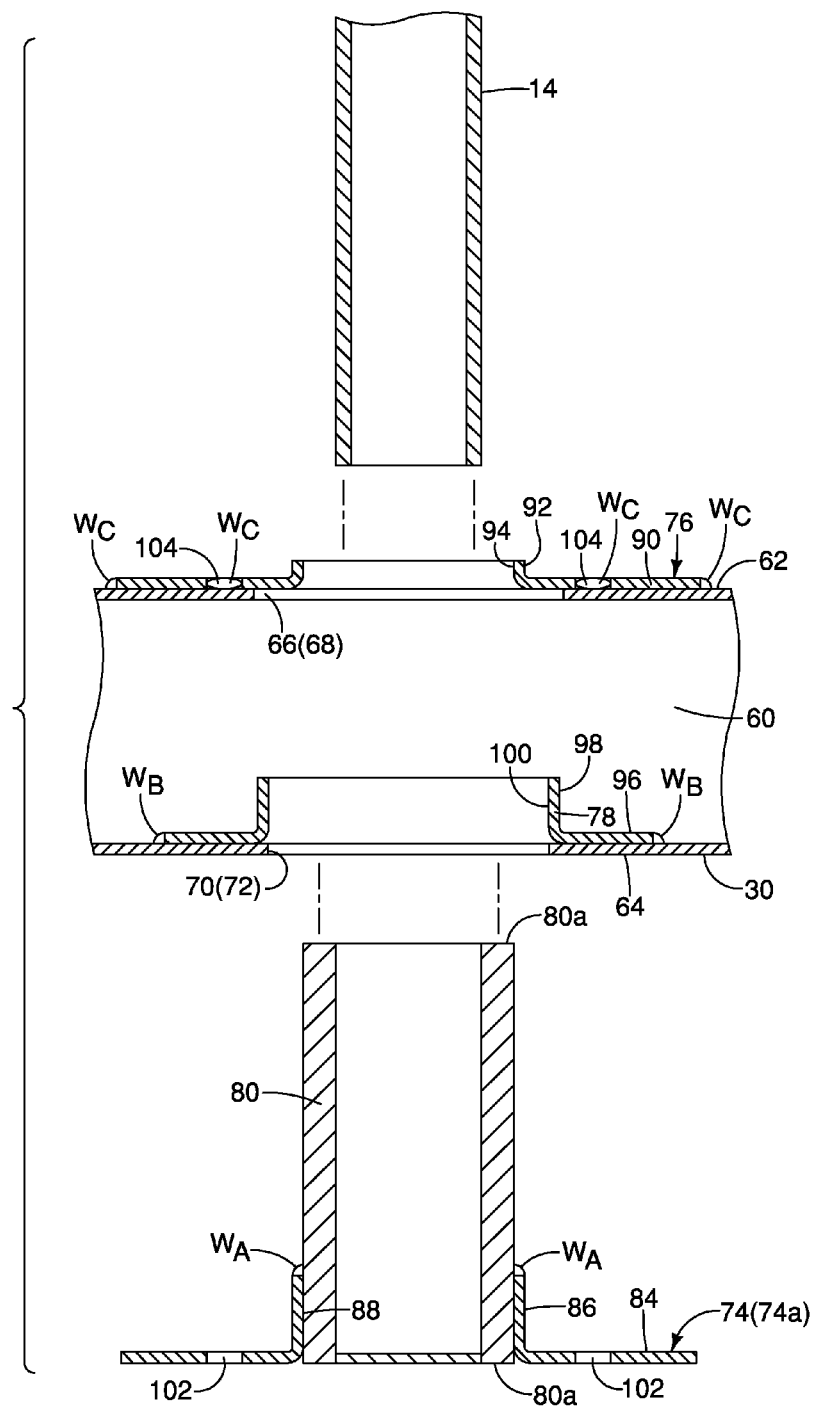
FIG. 15 is an exploded schematic cross-sectional view of the frame, the collar assembly and a portion of the off-center impact structure prior to assembly in accordance with the first embodiment.

As shown in FIGS. 5 and 15, the outboard wall 62 defines an outboard forward opening 66 that extends through the outboard wall 62 and to the hollow interior 60. The outboard wall 62 also defines an outboard rearward opening 68 that extends through the outboard wall 62 and to the hollow interior 60.

Figure 9:
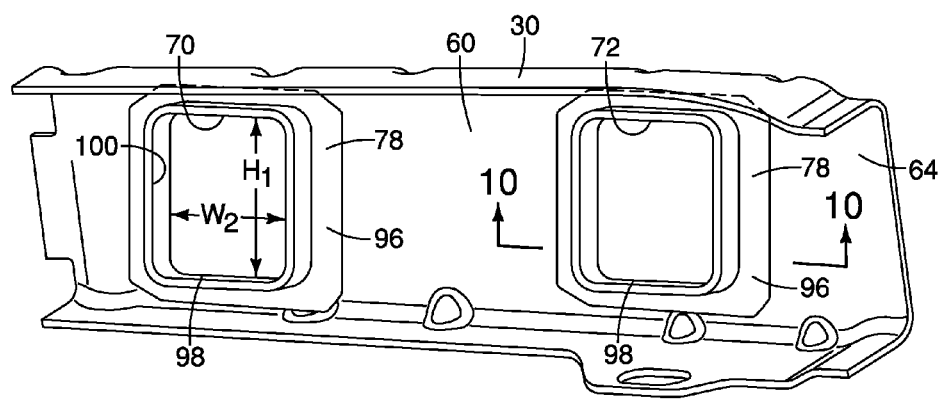
FIG. 9 is a perspective view of a portion of the first side member, showing an interior surface that at least partially defines the hollow interior of the first side member with the second collars attached to the interior surface of the first side member in accordance with the first embodiment.
Figure 14:
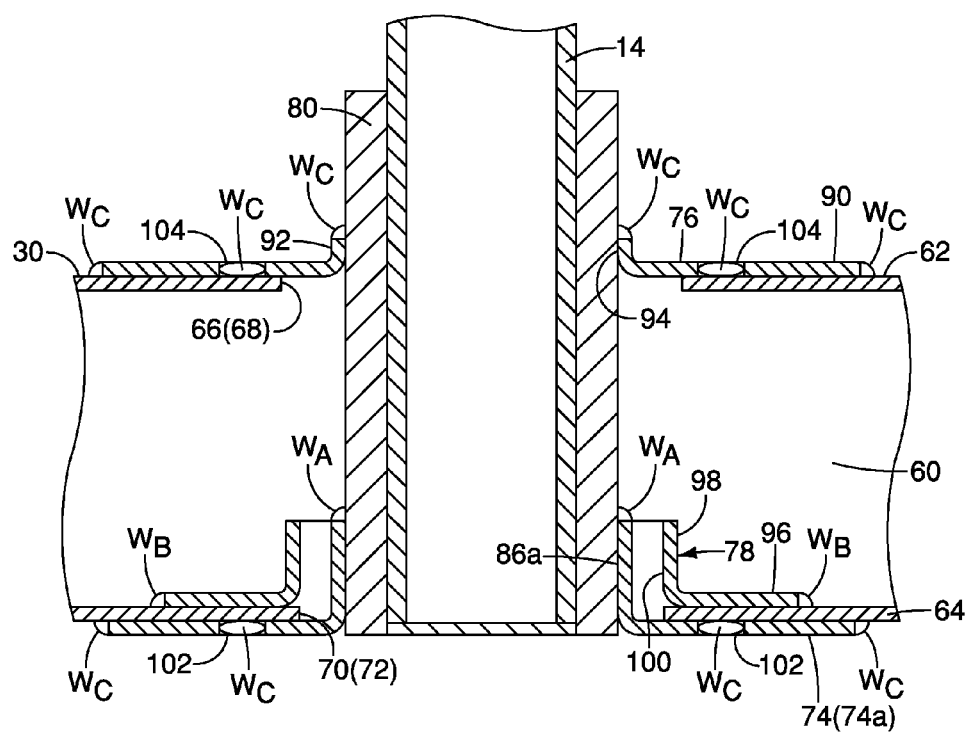
FIG. 14 is schematic cross-sectional view of the frame, the collar assembly and a portion of the off-center impact structure after assembly in accordance with the first embodiment.

As shown in FIGS. 5 and 15, the inboard wall 64 of the first side member 30 defines an inboard forward opening 70 aligned with the outboard forward opening 66 relative to the inboard direction $I_D$ and the outboard direction $O_D$ (lateral directions) of the first side member 30 (see FIGS. 14 and 15). Further, the inboard wall 64 of the first side member 30 has an inboard rearward opening 72 aligned with the outboard rearward opening 68 (see FIGS. 14 and 15). As shown in FIG. 9, the inboard forward opening 70 (and the inboard rearward opening 72) define a first height $H_1$ and a first width $W_1$.

As shown in FIG. 5, the outboard forward opening 66 and the inboard forward opening 70 are located forward of the body attachment structure 42. Further, the outboard rearward opening 68 and the inboard rearward opening 72 are located adjacent to but rearward of the body attachment structure 42. The body attachment structure 42 is attached to the outboard wall 62 of the first side member 30 along the front portion 32 (the front-section) rearward of the outboard forward opening 66 via, for example, welding techniques.

The front cross member 40 is attached to the first side member 30 at or adjacent to the front end 30a of the first side member 30. The front cross member 40 includes an outboard portion 40a that extends from the first side member 30 forward of the off-center impact structure 14 in the outboard direction $O_D$. In response to an impact event of an off-center impact test, the outboard portion 40a of the front cross member deforms contacting the off-center impact structure and further causing the front section of the first side member to break away from a rearward portion of the first side member or deform in an outboard direction relative to the rearward portion of the first side member pushing the first side member in a lateral direction away from an area of impact, as described in greater detail in co-pending U.S. application Ser. No. 15/404,334.

As shown in FIG. 5, the collar assembly 12 includes a first collar 74 (74a), a second collar 76, an optional third collar 78 and a sleeve 80.

Figure 6:
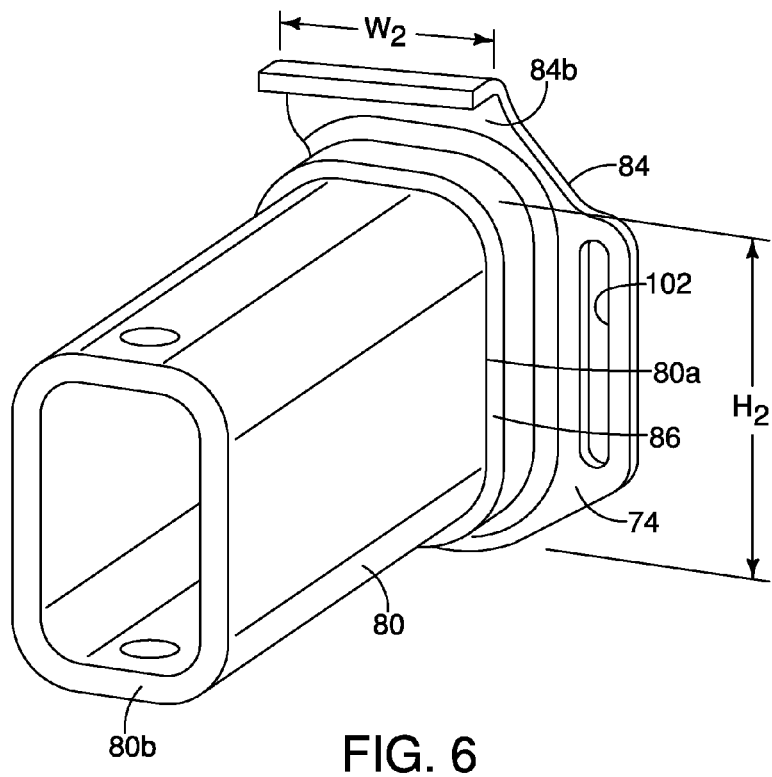
FIG. 6 is a perspective view of the sleeve removed from the first side member with the first collar attached thereto, the first collar having a first shape in accordance with the first embodiment.
Figure 7:
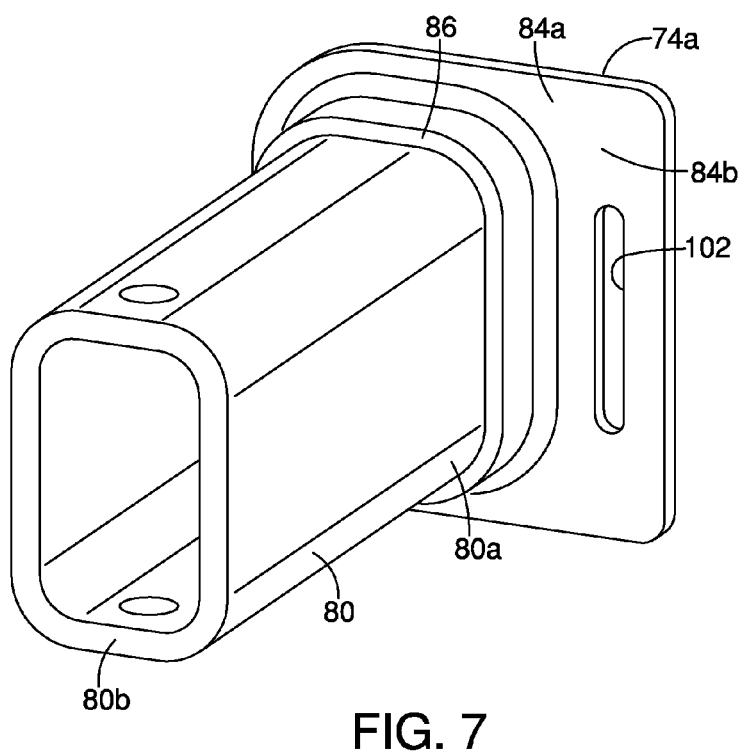
FIG. 7 is another perspective view of the sleeve removed from the first side member with the first collar attached thereto, the first collar having a second shape in accordance with the first embodiment.
Figure 11:
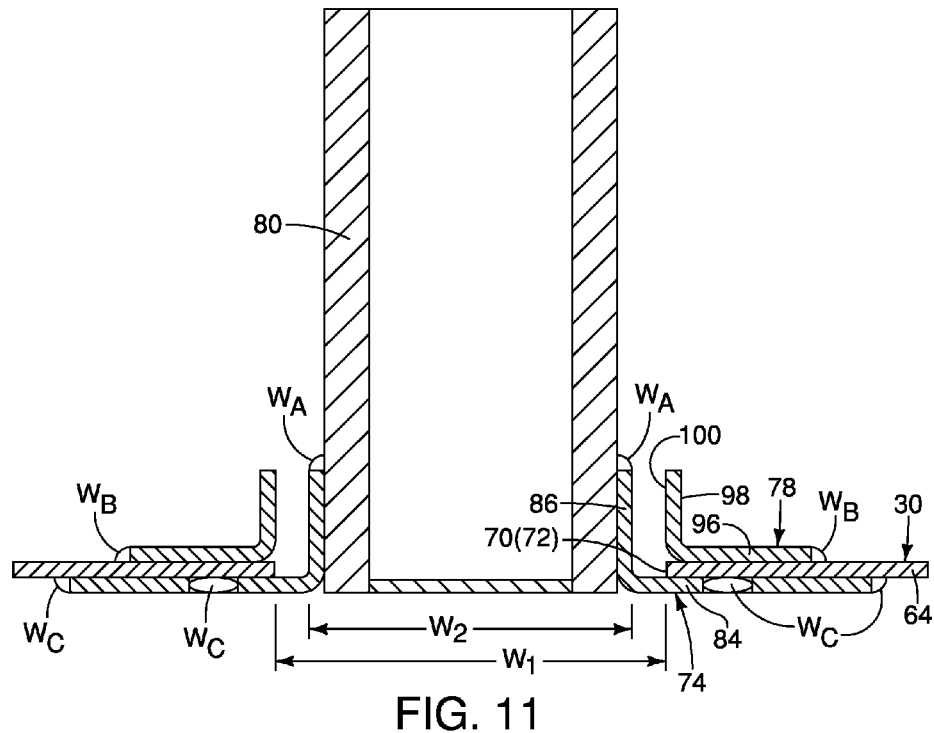
FIG. 11 is another cross-sectional view of a portion of the first side member similar to FIG. 10, showing the second collar fixedly attached to the interior surface of the first side member and the first collar fixedly attached to the outer surface of the first side member with the sleeve extending through an opening in the second collar in accordance with the first embodiment.

The first collar 74 (74a) includes a first attachment flange 84 and a first alignment flange 86. The first attachment flange 84 (84a) includes a flat surface that is shaped to overlay a portion of an inboard surface of the inboard wall 64 of the first side member 30. As shown in FIGS. 5-7, the first attachment flange 84 (84a) can have a variety of shapes, depending upon corresponding shapes of the first side member 30. As shown in FIGS. 11 and 14, the first attachment flange 84 (84a) contacts the inboard surface of the inboard wall 64 when installed to the first side member 30.

The first alignment flange 86 extends from the first attachment flange 84 such that at least a portion of the first alignment flange 86 is perpendicular to the first attachment flange 84. The first alignment flange 86 defines and surrounds a first aperture 88. The first aperture 88 is dimensioned such that a first end 80a of the sleeve 80 can be inserted into the first aperture 88 of the first collar 74 (74a). As shown in FIGS. 11 and 14, when installed to the sleeve 80 and the first side member 30, the first alignment flange 86 extends from the first attachment flange 84 (84a) and into the inboard forward opening 70 (or the inboard rearward opening 72—a first opening) of inboard wall 64 (a first wall) of the first side member 30 (the beam). The first alignment flange 86 of the first collar 74 includes outer surfaces that define a second width $W_2$ and a second height $H_2$. The second width $W_2$ is smaller than the first width $W_1$. Similarly, the second height $H_2$ is smaller than the first height $H_2$. Consequently, the first alignment flange 86 can be freely moved about within either of the inboard openings 70 and 72 first opening with the first collar 74 (74a) being inserted into within one of the inboard openings 70 and 72 but not yet fixed in position (not in a fully installed state). As is described further below, the movement of the first collar 74 relative to the first side member 30 allows for accurate positioning of the sleeve 80 relative to the first side member 30.

When the first collar 74 is installed to the first side member 30, at least a portion of the first attachment flange 84 (84a) extends in a direction parallel to the exterior surface of the inboard wall 64 (the first wall) of the first side member 30 (the beam). Further, the first alignment flange 86 extends in directions perpendicular to the portion of the first attachment flange 84 (84a). As is described further below, prior to inserting the sleeve 80 and the first collar 74 (74a) into one of the inboard openings 70 and 72 of the first side member, the first alignment flange 86 (and the first collar 74) can be fixedly attached to the sleeve member 80 with the sleeve member 80 and the first collar 74 (74a) in the uninstalled state.

As shown in FIGS. 5 and, 13-16, the second collar 76 has a second attachment flange 90 and a second alignment flange 92 that defines and surrounds a second aperture 94. The second attachment flange 90 is configured overlay a portion of an exterior surface or outboard surface of the outboard wall 62 (a second wall) of the first side member 30 (the beam) when installed to the first side member 30, as described below. The second aperture 94 of the second collar 76 is dimensioned to receive the sleeve 80.

The second attachment flange 90 of the second collar 76 extends in a direction parallel to the outboard surface of the first side member 30. Further, the second alignment flange 92 extends in directions perpendicular to the second attachment flange 90.

It should be understood from the drawings and the description herein that the first aperture 88 of the first collar 74 (74a) fits snuggly around the sleeve 80, within close predetermined tolerance. Once the sleeve 80 is fitted to the first collar 74 (74a) the sleeve 80 is preferably held in place within the first aperture 88 of the first collar 74 (74a). Similarly, the second aperture 94 of the second collar 76 fits snuggly around the sleeve 80, within close predetermined tolerance. Once the sleeve 80 is fitted to the second collar 76 the sleeve 80 is preferably held in place within the second aperture 94 of the second collar 76.

The third collar 78 is optional and is not required for most applications of the collar assembly 12. However, in installations with, for example, the off-center impact structure 14, the third collar 78 can provide additional resistance to deformation of the first side member 30 during an impact event.

When employed, as shown in FIGS. 9, 10, 14 and 15, the third collar 78 is fixedly attached to an interior surface of the inboard wall 64 within the hollow interior 60 of the first side member 30. The third collar 78 includes a third attachment flange 96 and a third alignment flange 98 that defines a third aperture 100. The third attachment flange 96 extend in a direction parallel to the interior surface of the inboard wall 64 (the first wall) of the first side member 30 (the beam). The third alignment flange 98 extend in directions perpendicular to the third attachment flange 96. When fully installed with the first side member 30 the sleeve 80 extends through the third aperture 100 of the third collar 78, such that the third collar 78 encircles the sleeve 80 (the sleeve member). The third aperture 100 has a height and width that are greater than the height and width of the sleeve 80, such that the sleeve 80 need not make contact with the third collar 78. Rather, the third collar 78 being attached to the interior surface of the first side member 30 within the hollow interior 60 provides additional stiffness and rigidity to the inboard wall 64 of the first side member 30.

The sleeve 80 is a hollow beam like member with open ends. The sleeve 80 extends through the outboard forward opening 66 (or the outboard rearward opening 68), through the hollow interior 60 and through the inboard forward opening 70 (or the inboard rearward opening 72). However, the dimensions of the sleeve 80 are smaller than the dimensions of the outboard forward opening 66 (or the outboard rearward opening 68) and the inboard forward opening 70 (or the inboard rearward opening 72). Hence, the sleeve 80 preferably does not contact either the outboard wall 62 or the inboard wall 64 of the first side member 30 unless necessary for proper alignment of the off-center impact structure 14. As shown in FIG. 14, a first end 80a of the sleeve 80 is located proximate the inboard wall 64 (the first wall) and a second end 80b of the sleeve 80 is spaced apart from the outboard wall (the second wall) and the hollow interior 60 of the first side member 30 (the beam).

In the depicted embodiment, the collar assembly 12 serves several purposes. For instance, the collar assembly 12 serves to reinforce the first side member 30 in the areas around the outboard forward opening 66, the outboard rearward opening 68, the inboard forward opening 70 and the inboard rearward opening 72. Further, the collar assembly 12 makes it possible to accurately position the sleeve 80 and the off-center impact structure 14 in a predetermined orientation relative to the first side member 30.

Figure 8:
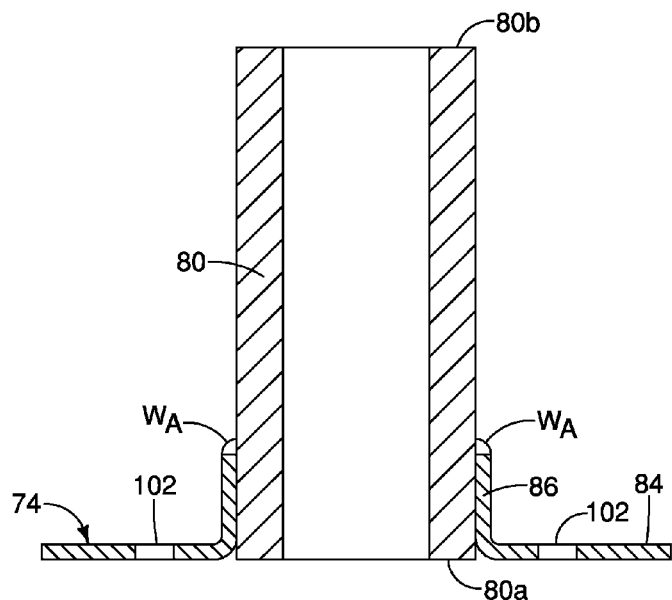
FIG. 8 is a schematic cross-sectional view of the sleeve and the first collar shown removed from the frame in accordance with the first embodiment.
Figure 10:
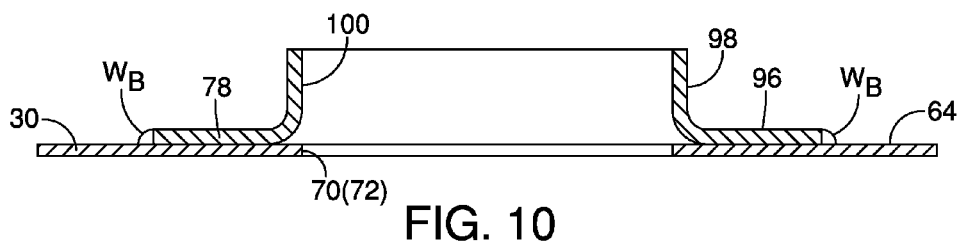
FIG. 10 is a cross-sectional view of a portion of the first side member taken along the line 10-10 in FIG. 9, showing one of the second collars fixedly attached to the interior surface of the first side member in accordance with the first embodiment.

The collar assembly 12 and the off-center impact structure 14 are assembled and installed in the following manner. First, as shown in FIGS. 6 and 7, the first collar 74 (74) is fitted on to the first end 80a of the sleeve 80. Shortly thereafter, the first collar 74 (74a) is welded to the sleeve 80 as indicated by welds WA in FIG. 8. Next, (if used) the optional third collars 78 are inserted through the outboard forward opening 66 (or the outboard rearward opening 68) and the inboard forward opening 70 (or the inboard rearward opening 72) and fitted to the interior surface of inboard wall 64 such that the third aperture 100 of the third collar 78 aligns with a corresponding one of the inboard forward opening 70 and the inboard rearward opening 72, as shown in FIGS. 9 and 10. Thereafter, the third collars 78 are welded to the interior surface of inboard wall 64 thereby defining welds $W_B$.

Figure 12:
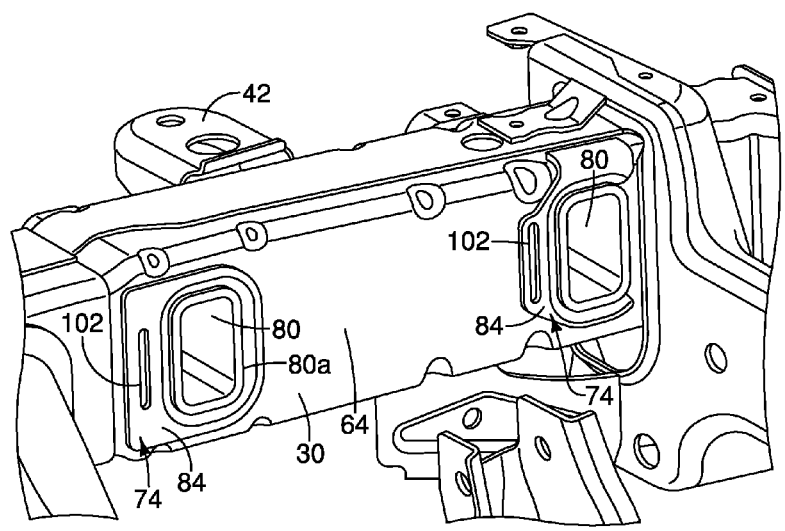
FIG. 12 is a perspective view of an inboard side of the first side member showing the first collar fixedly attached to the outer surface of the first side member with the sleeve extending through the opening in the second collar in accordance with the first embodiment.

Next, as shown in FIGS. 11 and 12, the welded first collar 74 (74a) and the sleeves 80 are inserted from the inboard side into respective ones of the inboard forward opening 70 and the inboard rearward opening 72, and further through the third apertures 100 of the third collar 78. The first attachment flange 84 of the first collar 74 (74a) is larger than the inboard forward opening 70 and the inboard rearward opening 72. Consequently, the first attachment flange 84 prevents the first collar 74 from passing into the hollow interior 60 of the first side member 30. Since dimensions of the inboard forward opening 70 and the inboard rearward opening 72 are larger than the dimensions of the first alignment flange 86, and the outer dimensions of the sleeve 80 are smaller than the dimensions of the outboard forward opening 66 and the outboard rearward opening 68, the sleeve 80 and the first collar 74 can undergo limited movement up and down, and forward and backward relative to the first side member 30. Consequently, the sleeve 80 can be moved to a predetermined orientation and/or position relative to the first side member 30.

Figure 13:
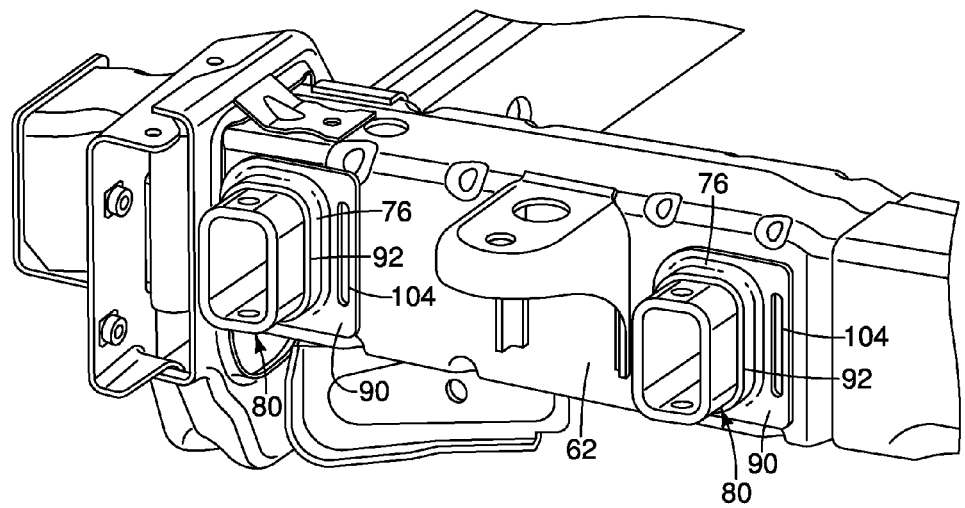
FIG. 13 is a perspective view of an outboard side of the first side member showing the sleeve extending through an opening in the third collar in accordance with the first embodiment.

Next, as shown in FIG. 13, the second collar 76 is fitted around the second end 80b of the sleeve 80 from the outboard side of the first side member 30. The second collar 76 is then pushed flush with the outboard surface of the outboard wall 64 of the first side member 30. Since the second collar 76 can be moved up and down and forward and rearward relative to the front side member 30, the sleeve 80 can continue to be moved and adjusted to put it into the predetermined orientation and/or position relative to the first side member 30.

At this point, the collar assembly 12 is in an assembled state, but has not yet been fixed in position. Therefore, the collar assembly 12 is in an uninstalled state and is still movable and repositionable relative to the first side member 30.

Next, as shown in FIG. 14 the two parallel ends of the off-center impact structure 14 are inserted into respective ones of the sleeves 80 of the two collar assemblies 12. At this time, the collar assembly 12 is still in an uninstalled state and is still movable and repositionable relative to the first side member 30. Once the desired orientation and position of the collar assemblies 12 and the off-center impact structure 14 is achieved, the first collar 74 (74a) and the second collar 76 can be welded in place defining welds $W_C$, as shown in FIG. 14. The welds $W_C$ are also indicted in FIG. 15, however FIG. 15 depicted the various elements of the collar assembly 12, the off-center impact structure 14 and the first side member 30 separated from one another to show their respective relationships.

The welds $W_C$ are basically welds along respective edges of the first collar 74 and the second collar 76 such that the edges of the first collar 74 are welded to the inboard wall 64 of the first side member 30 and the edges of the second collar 76 are welded to the outboard wall 62 and the sleeve 80. For additional welding surfaces, the first collar 74 is provided with slots 102 and the second collar 76 is provided with slots 104 such that the welds WC also include applying welding material with the slots 102 and 104, as shown in FIG. 14.

Figure 16:
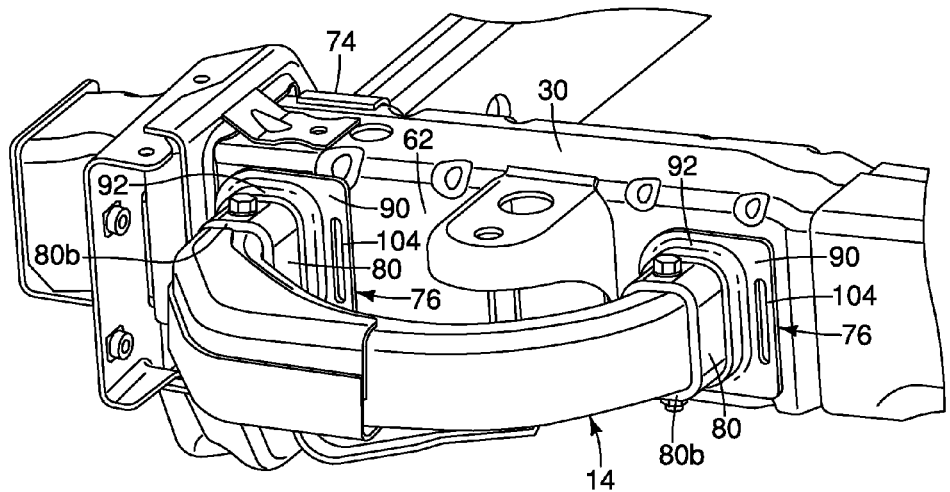
FIG. 16 is a perspective view of the outboard side of the first side member showing the collar assembly and the off-center impact structure fully installed and assembled in accordance with the first embodiment.
Figure 17:
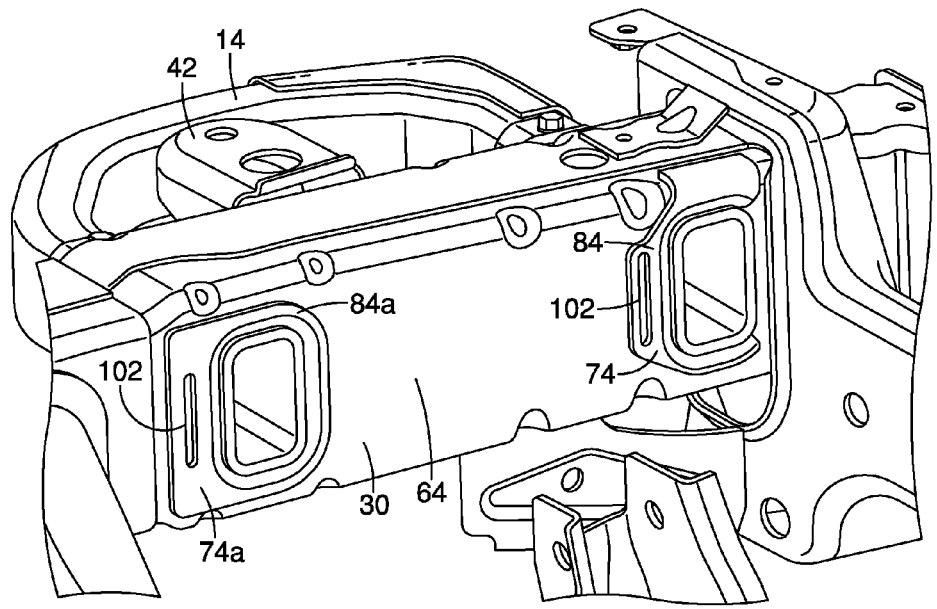
FIG. 17 is a perspective view of the inboard side of the first side member showing the collar assembly and the off-center impact structure fully installed and assembled in accordance with the first embodiment.

FIGS. 16 and 17 show the collar assembly 12 and the off-center impact structure 14 welded in the installed state and in the predetermined orientation.

Once the collar assemblies 12 are positioned and/or installed to the first side member 30, mechanical fasteners $F_1$ and $F_2$ can be employed to attach the off-center impact structure 14 to the collar assemblies 12.

In the depicted embodiment, a pair of the collar assemblies 12 is employed. However, it should be understood from the drawings and the description herein that one of the collar assemblies 12 can be used to install and position a single cantilevered beam to another beam in a manner consistent with the description above. Also, in another embodiment, two of the collar assemblies 12 can be used to position, orient and install a beam such as one of the first cross-member 34, the second cross-member 36, the third cross-member 38 and/or the front cross-member 40 to the first and second side members 30 and 32 of the frame 22, with one of the collar assemblies at one end of the corresponding cross-member, and the other of the collar assemblies at the opposite end of the cross-member.

The various vehicle body structure elements (except the collar assemblies 12) are conventional components that are well known in the art. Since such vehicle body structure elements are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the collar assemblies of the vehicle body structure. Accordingly, these terms, as utilized to describe the present invention should be interpreted relative to a vehicle equipped with the collar assemblies of the vehicle body structure.

The term "configured" as used herein to describe a component, section or part of a device includes hardware that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising:
   a beam having a first wall and a second wall opposite the first wall defining a hollow interior therebetween, the first wall having a first opening and the second wall having a second opening;
   a sleeve member extending through the first opening, the hollow interior and the second opening of the beam, the sleeve member having a first end located proximate the first wall and a second end spaced apart from the second wall and the hollow interior of the beam;
   a first collar having a first attachment flange that overlays a portion of an exterior surface of the first wall of the beam and a first alignment flange defining a first aperture with the first end of the sleeve member extending into the first aperture of the first collar, the first alignment flange extending from the first attachment flange and into the first opening of the first wall of the beam; and
   a second collar having a second attachment flange that overlays a portion of an exterior surface of the second wall of the beam, the second collar having a second aperture with the sleeve member extending therethrough,
   wherein with the sleeve member in an uninstalled state relative to the beam, the first collar and the second collar are re-position-able along the exterior surfaces of the beam such that the sleeve member is moved to a predetermined orientation relative to the beam and in an installed state the first collar and the second collar are fixedly attached to the beam and the sleeve member with the sleeve member being fixedly positioned in the predetermined orientation by the first and second collars.

2. The vehicle body structure according to claim 1, wherein
   the beam is part of a vehicle frame that extends in a vehicle longitudinal direction.

3. The vehicle body structure according to claim 1, wherein
   the first opening of the first wall of the beam has inner surfaces that define a first width and a first height, and
   the first alignment flange of the first collar includes outer surfaces that define a second width and a second height, the second width being smaller than the first width and the second height being smaller than the first height such that the first alignment flange is moveable within the first opening with the first collar being in the uninstalled state.

4. The vehicle body structure according to claim 1, wherein
   at least a portion of the first attachment flange extends in a direction parallel to the exterior surface of the first wall of the beam, and the first alignment flange extends in directions perpendicular to the portion of the first attachment flange.

5. The vehicle body structure according to claim 1, wherein
the second collar includes a second alignment flange that extends in directions perpendicular to the second attachment flange, and the second alignment flange defining the second aperture.

6. The vehicle body structure according to claim 1, further comprising:
a third collar fixedly attached to an interior surface of the first wall of the beam within the hollow interior of the beam, the third collar encircling the sleeve member.

7. The vehicle body structure according to claim 6, wherein
the third collar includes a third attachment flange and a third alignment flange, the third attachment flange extending in a direction parallel to the interior surface of the first wall of the beam, and the third alignment flange extending in directions perpendicular to the third attachment flange.

8. The vehicle body structure according to claim 1, wherein
the first alignment flange of the first collar is fixedly attached to the sleeve member with the sleeve member in the uninstalled state.

9. The vehicle body structure according to claim 1, further comprising:
a hollow beam member inserted into the second end of the sleeve member and extending to proximate the first end of the sleeve member with the sleeve member in the uninstalled state and the hollow beam member being fixedly attached to the sleeve member with the sleeve member being fixedly attached to the beam.

10. The vehicle body structure according to claim 1, wherein
in the uninstalled state the sleeve member is inserted into the first and second openings of the beam but is movable with respect thereto, and
in the installed state the sleeve member is welded to the first and second collars and the first and second collars are welded to the beam.

11. A method of assembling a vehicle body structure, comprising:
providing a beam with a first wall and a second wall opposite the first wall defining a hollow interior therebetween, the first wall having a first opening and the second wall having a second opening open to the hollow interior;
providing a first collar with a first attachment flange and a first alignment flange, the first alignment flange defining a first aperture;
providing a sleeve member with a first end, a second end and a hollow interior;
inserting the sleeve member into the first aperture of the alignment flange of the first collar such that the first collar remains at the first end of the sleeve member;
inserting the first sleeve member and the first collar into the first opening of the first wall of the beam such that the first attachment flange overlays a portion of an exterior surface of the first wall of the beam and the first alignment flange extends into the first opening of the first wall of the beam and the second end of the sleeve member extends out of the second opening of the second wall of the beam;
providing a second collar with a second attachment flange and a second aperture;
fitting the second collar around the second end of the sleeve member with the second end of the sleeve member extending through the second aperture of the second collar;
adjusting locations of the first collar and the second collar relative to the first wall and the second wall, respectively such that the sleeve member is positioned with a predetermined orientation relative to the beam in an uninstalled state; and
installing the first collar and the second collar to the beam and the sleeve member such that the first collar, the second collar and the sleeve member are non-movable relative to the beam with the sleeve member in the predetermined orientation relative to the beam.

12. The method of assembling a vehicle body structure according to claim 11, wherein
the installing of the first collar and the second collar to the beam and the sleeve member includes welding the first collar and the second collar to both the beam and the sleeve member.

13. The method of assembling a vehicle body structure according to claim 11, wherein
the providing of the first collar and the providing of the sleeve member includes welding the first collar to the first end of the sleeve member prior to the installing of the first collar and the second collar to the beam and the sleeve member.

14. The method of assembling a vehicle body structure according to claim 11, wherein
the providing of the beam includes the first opening having a first height and a first width and
the providing of the first collar include the first alignment flange having a second height that is smaller than the first height and a second width that is smaller than the first width.

15. The method of assembling a vehicle body structure according to claim 11, wherein
the providing of the first collar includes the first attachment flange extending in a direction parallel to the exterior surface of the first wall of the beam, and the first alignment flange extending in directions perpendicular to the first attachment flange.

16. The method of assembling a vehicle body structure according to claim 11, wherein
the providing of the second collar includes a second alignment flange extending in a direction perpendicular to the second wall of the beam.

17. The method of assembling a vehicle body structure according to claim 11, further comprising:
fixedly attaching a third collar to an interior surface of the first wall of the beam within the hollow interior of the beam, the third collar encircling the sleeve member.

18. The method of assembling a vehicle body structure according to claim 17, wherein
the fixedly attaching of the third collar includes the third collar having a third attachment flange and a third alignment flange, the third attachment flange extending in a direction parallel to the interior surface of the first wall of the beam, and the third alignment flange extending in directions perpendicular to the third attachment flange.

19. The method of assembling a vehicle body structure according to claim 11, further comprising:

providing a hollow beam member that is inserted into the second end of the sleeve member and extends to proximate the first end of the sleeve member.

* * * * *